United States Patent
Sakamoto et al.

(10) Patent No.: US 7,124,127 B2
(45) Date of Patent: Oct. 17, 2006

(54) SEARCH SERVER AND METHOD FOR PROVIDING SEARCH RESULTS

(75) Inventors: Takuya Sakamoto, Kawasaki (JP); Takushi Fujita, Kawasaki (JP); Toru Kamiwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 383 days.

(21) Appl. No.: 10/270,187

(22) Filed: Oct. 15, 2002

(65) Prior Publication Data

US 2003/0182258 A1 Sep. 25, 2003

(30) Foreign Application Priority Data

Mar. 20, 2002 (JP) .............................. 2002-079278

(51) Int. Cl.
G06F 7/00 (2006.01)
G06F 15/00 (2006.01)

(52) U.S. Cl. .................. 707/3; 707/100; 715/501.1

(58) Field of Classification Search .................... 707/3, 707/5, 10, 100; 715/500, 501.1
See application file for complete search history.

(56) References Cited

U.S. PATENT DOCUMENTS 5,913,215 A * 6/1999 Rubinstein et al. ........... 707/10
6,169,986 B1 * 1/2001 Bowman et al. ............... 707/5
6,631,496 B1 * 10/2003 Li et al. ................... 715/501.1
6,732,088 B1 * 5/2004 Glance ........................ 707/3

FOREIGN PATENT DOCUMENTS

| JP | 10-260888 | 9/1998 |
| JP | 11-345238 | 12/1999 |
| JP | 2000-29906 | 1/2000 |
| JP | 2000-90103 | 3/2000 |
| JP | 2000-112981 | 4/2000 |
| JP | 2000-172248 | 6/2000 |
| JP | 2000-322434 | 11/2000 |
| JP | 2001-306584 | 11/2001 |

* cited by examiner

Primary Examiner—Sam Rimell
(74) Attorney, Agent, or Firm—Staas & Halsey LLP

(57) ABSTRACT

A search server and method for providing search results are provided in which search results can be transmitted efficiently to a client computer that uses a browser that changes plural displays of contents using a virtual three-dimensional space. The server comprises a web page information storing portion for collecting web page information and URLs from a network so as to store them, a keyword obtaining portion for obtaining a keyword from the client computer, a keyword searching portion for searching web page information containing the obtained keyword, a reference URL obtaining portion for obtaining a URL of a web page to be a reference, and a link searching portion for searching a chain of links from the web page to be a reference to the web page obtained by the keyword searching portion. The search server transmits a list of URL trains corresponding to the chain of links to the client computer.

9 Claims, 12 Drawing Sheets

URL OF B: http://www.b/b.xml
URL OF C: http://www.c/c.xml
URL OF D: http://www.d/d.xml
URL OF F: http://www.f/f.xml
URL OF H: http://www.h/h.xml

LINK FROM A TO B AND C
LINK FROM B TO D
LINK FROM D TO F AND G

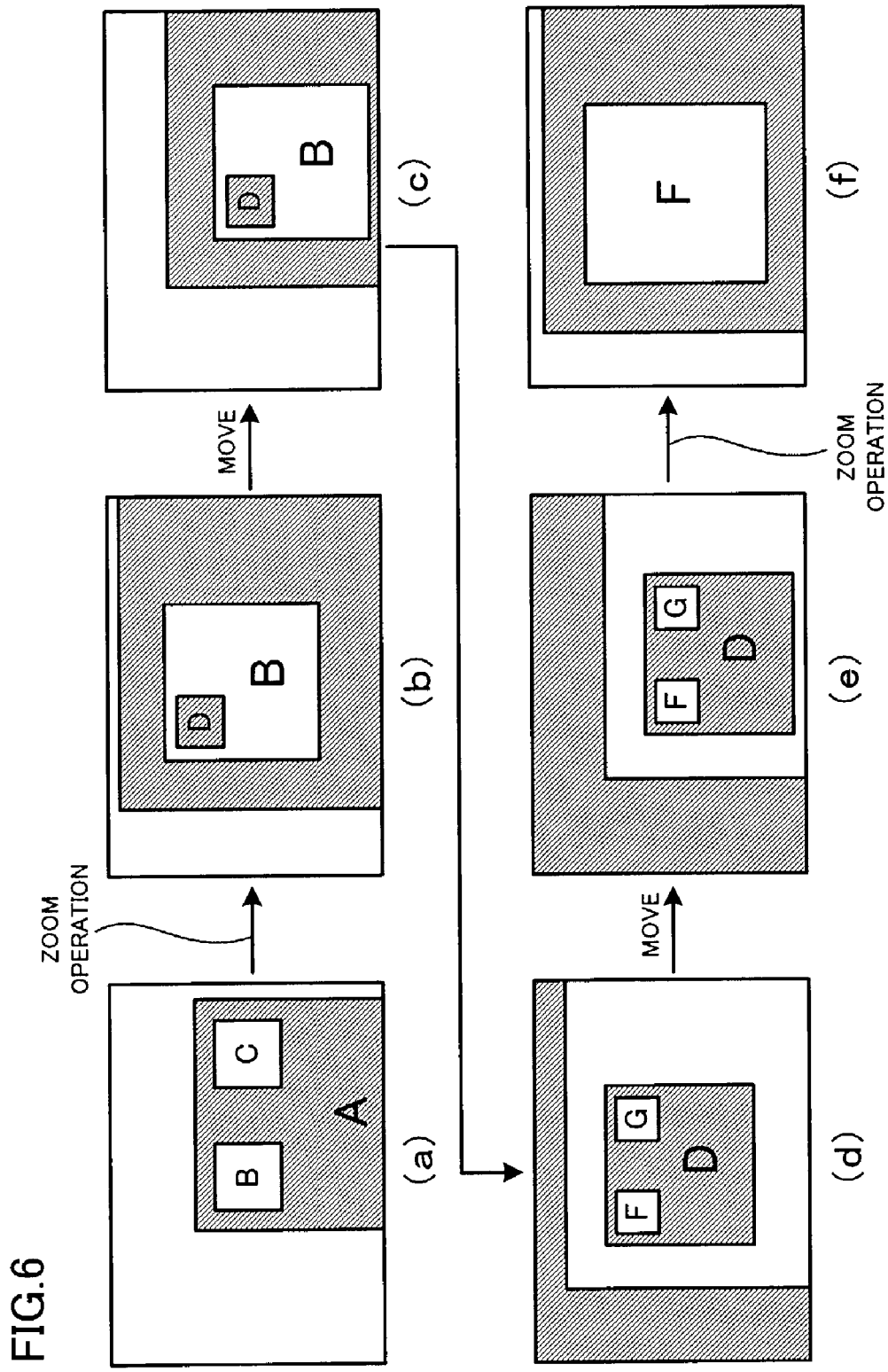

FIG.7

```
<?xml version="1.0" encoding="Shift_JIS"?>
<SearchLinks href="http://www.b/b.xml http://www.d/d.xml http://www.f/f.xml" />
<SearchLinks href="http://www.c/c.xml http://www.d/d.xml http://www.g/g.xml" />
<SearchLinks href="http://www.c/c.xml http://www.c/c2.xml http://www.g/g.xml" />
<SearchLinks href="http://www.e/e.xml http://www.e/e2.xml http://www.e/e3.xml http://www.g/g.xml" />
```

FIG.9

```
<?xml version="1.0" encoding="Shift_JIS"?>
<Node>
<Link href="http://www.f/index.xml"/>
<IsLinked href="http://www.b/index.xml"/>
<TopPage href="http://www.a/index.xml"/>
<TextPanel> <Text> D </Text></TextPanel>
</Node>
```

SEARCH SERVER AND METHOD FOR PROVIDING SEARCH RESULTS

BACKGROUND OF THE INVENTION

1. Field of the Invention

The present invention relates to a search server and a method for providing search results or necessary information efficiently to users who browse information via a network.

2. Description of the Prior Art

There are a lot of search engines exhibited on the Internet for searching web pages described in HTML (Hypertext Markup Language). Most of the search engines utilize a technique including registering process and searching process. In the registering process, a crawler and a program repeat a process of tracing links described in a web page one by one, so as to have cyclic access to web pages on the Internet and to collect web pages. The collected web pages and URLs are registered in a database. In the searching process, a search condition (mainly keywords) that a user entered is checked against the database so that web pages matching the search condition are found and provided to the user as search results.

In addition, there is a search engine that ranks plural web pages obtained as the search results and display them in descending order of the rank, so that the user can find the target web page easily. As the ranking method (condition), several methods are used such as a method of checking occurrence frequency of the keywords that the user entered, a method of utilizing an HTML structure (e.g., a title or a header portion is assigned with high weight) or a method of checking the number of links from other web pages in accordance with the link structure.

The user may check the ranked search results and may click a URL portion in the display, so that a web page of the search results is displayed on the browser. Most web pages that are currently provided are based on character data, and a lot of words and phrases are contained in a web page. Therefore, the user can find a target web page by the search with designating plural keywords.

Not only the search engines for web pages, image search engines for searching images on the Internet for example are also exhibited on the Internet. Such an image search engine utilizes the HTML structure and a method that utilizes text neighboring an image or a caption of an image. Therefore, the method for searching images is not so different from the method for searching web pages based on character data. The user can check the search results and browse the web page where the desired image is exhibited by click operation using a mouse in the same way as the search based on the character data. Thumbnail images are used as the search results so that a user can find a target image easily.

In addition, along with improvement of performances of a computer and a network, the number of web pages that use a lot of data (especially image data)-and utilize a virtual three-dimensional space for expressing three-dimensional contents has been increasing. Japanese unexamined patent publication No. 2000-172248 discloses one of such techniques, in which a link is utilized for displaying plural contents simultaneously in a virtual three-dimensional space. Contents of the link destination are overlaid on the link origin, and the link destination contents are displayed in smaller size than the link origin contents. Zoom operation enables the link destination to be enlarged in the display, so that plural link destinations are displayed one by one sequentially.

However, most web sites do not contain all information in one web page, but the information is divided into plural web pages that are linked to each other. As a result, the information displayed in one web page is limited, and it may be difficult to understand the contents of the web page only by a glance of the web page that was found to contain the keyword. In this case, information of the link origin or other web pages is necessary. Especially in the case of a web page that contains images mainly or utilizes a virtual three-dimensional space, character information contained in one web page is so little that it is difficult to find a target by the method of searching keywords contained in the web page.

Furthermore, in a normal HTML browser, the abrupt change of the screen display caused by the click operation at the link-embedded portion may puzzle the user. As a solution to that problem, there is a method of changing the plural contents of display continuously in a virtual three-dimensional space. However, it is difficult to use the conventional search technique effectively for such a method.

SUMMARY OF THE INVENTION

An object of the present invention is to provide a search server that can transmit effective search results to a client computer using a browser that can change the plural contents of display continuously in a virtual three-dimensional space and a method for providing search results.

A search server according to the present invention comprises a web page information storing portion for collecting web page information and URLs from a network so as to store them, a keyword obtaining portion for obtaining a keyword from a client computer, a keyword searching portion for searching web page information containing the obtained keyword, a reference URL obtaining portion for obtaining a URL of a web page to be a reference, and a link searching portion for searching a chain of links from the web page to be a reference to the web page obtained by the keyword searching portion. The search server transmits a list of URL trains corresponding to the chain of links to the client computer.

Thus, web pages can be displayed tracing a link in a client computer using a browser that can display web pages continuously. A user can understand relationship among web pages easily since not a single web page but a set of continuous web pages can be browsed.

In a preferred embodiment, the reference URL obtaining portion obtains the URL of the web page to be a reference from the client computer. In other words, the client computer transmits the URL of the web page to be a reference together with the keyword to the search server. Thus, the user can browse a target web page with grabbing a link from a current display state.

In another preferred embodiment, the reference URL obtaining portion obtains a top page URL from the web server storing the web page obtained by the keyword searching portion and sets the URL as the URL of the web page to be a reference. Thus, the user can browse a target web page with grabbing a link from a top page. This embodiment is effective since most current web sites are constituted to have a top page in which general information is described and linked web pages containing detail contents.

In still another preferred embodiment, if the keyword obtaining portion obtains plural keywords from the client computer, the keyword searching portion searches a web page that contains some of the plural keywords and checks whether other keywords are contained in one or more web pages constituting the chain of links detected by the link searching portion. If the other keywords are contained in the web pages, the URL train corresponding to the chain of links thereof is included in the list of URL trains that is transmitted to the client computer.

According to this search server, if all the requested contents are contained not in one web page but in plural linked web pages, they are found effectively. For example, a web page containing much image information and little text information can be found easily.

A method for providing search results according to the present invention comprises the steps of transmitting a list of URL trains as the search results from a search server to a client computer, wherein the list of URL trains is transmitted so that a browser of the client computer can display web pages corresponding to the URL train sequentially. Preferably, the web pages obtained by the keyword searching portion are sequenced before being transmitted to the client computer in accordance with information of one or more web pages that constitute the chain of links obtained corresponding to each of the web pages, and the list of URL trains is transmitted so that a display object of a web page that is assigned to higher order can be highlighted.

BRIEF DESCRIPTION OF THE DRAWINGS

FIG. 6 shows a change of the display screen when the first link chain is selected in the search results screen shown in FIG. 5.

FIG. 7 shows an example of data as the search result that is transmitted from the search server to the client computer.

FIG. 9 shows an example of web page data.

DESCRIPTION OF THE PREFERRED EMBODIMENTS

Hereinafter, the present invention will be explained more in detail with reference to embodiments and drawings.

Figure 1:
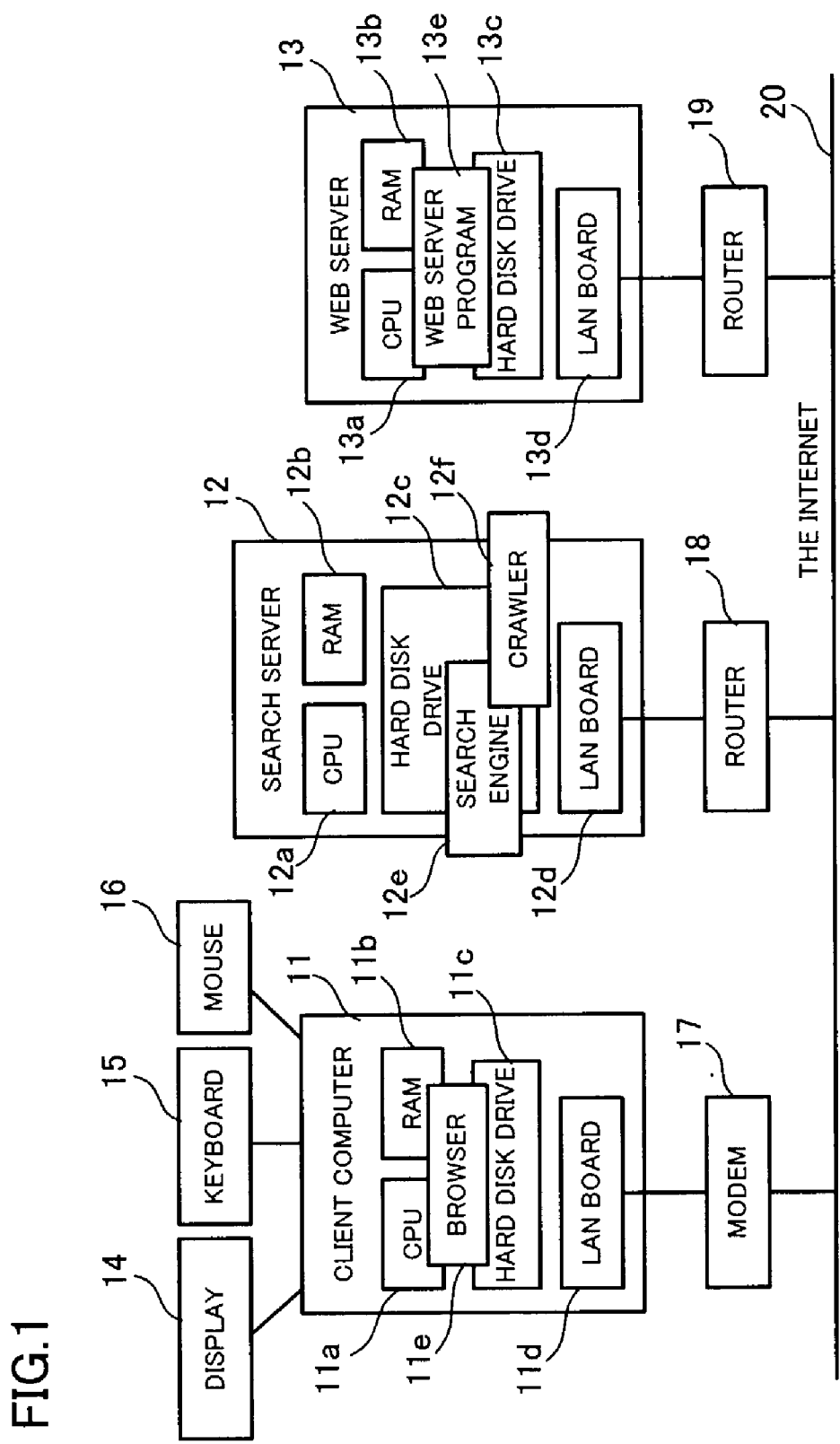
FIG. 1 is a block diagram showing an example of a computer system for realizing a method for searching information according to an embodiment of the present invention.

FIG. 1 is a block diagram showing an example of a computer system for realizing a method for searching information according to an embodiment of the present invention. A client computer 11, a search server 12 and a web server 13 are connected to the Internet 20 via a modem 17, a router 18 and a router 19, respectively.

The client computer 11 includes a CPU 11a, a RAM 11b, a hard disk drive 11c and a LAN board 11d. A display 14, a keyboard 15 and a mouse 16 are connected to the client computer 11. Furthermore, the client computer 11 is accessible to the Internet 20 via the modem 17. A browser 11e that is a program for browsing information is installed in the hard disk drive 11c, so that a user can use the browser 11e for browsing contents obtained from the Internet 20. The browser 11e can display plural web pages in overlaid manner using a link, which will be explained later in detail.

The search server 12 includes a CPU 12a, a RAM 12b, a hard disk drive 12c and a LAN board 12d similarly to the client computer 11. A search engine 12e and a crawler 12f are installed in the hard disk drive 12c. The crawler 12f works continuously so as to collect information of web pages designated by other web servers and web pages linked from the designated web page and to save the collected information together with URLs in the hard disk drive 12c. This crawler 12f is widely used in normal robot type web search, so detail explanation is omitted. The search engine 12e responds to a request from the client computer 11 and searches web page information collected by the crawler 12f so as to transmit search results to the client computer. The search engine 12e will be explained later in detail.

The web server 13 is accessible to the Internet 20 via the router 19. The web server 13 includes a CPU 13a, a RAM 13b, a hard disk drive 13c and a LAN board 13d. A web server program 13e is installed in the hard disk drive 13c. The web server program 13e responds to a request from the client computer 11 or the search server 12 and transmits information of web pages. The operation thereof is the same as a normal web server connected to the Internet 20, so detail explanation is omitted.

Figure 2:
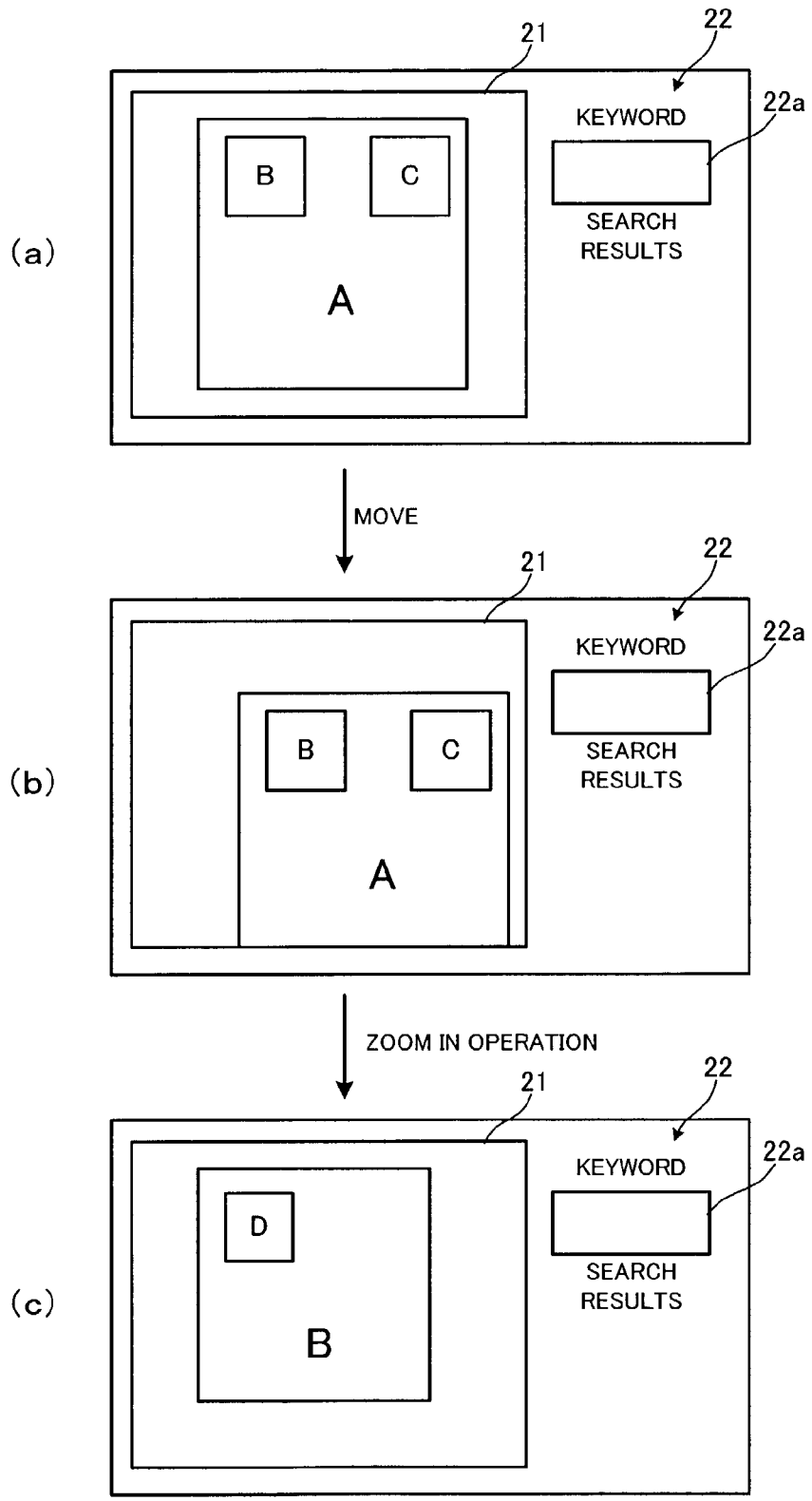
FIG. 2 shows an example of a screen of a browser in this embodiment.

FIG. 2 shows an example of a screen of a browser in this embodiment. More specifically, it shows a screen display changing from (a) through (c) responding to user's operation using a mouse. The browser 11e has a display object area 21 for displaying display objects and a keyword input area 22 for input using a keyword. The display object area 21 displays a display object generated from information of a web page and a display object generated from information of a web page linked from the web page, at the same time.

The display objects A, B, C and D displayed in the display object areas 21 in (a), (b) and (c) of FIG. 2 are display objects that are generated from information of different web pages. The display object A has links to the display objects B and C, and the display object B has a link to the display object D.

The user can conduct a zoom in operation and a zoom out operation by click operation of a mouse button. The zoom in operation enlarges the display object of the link destination. At the same time, a display object generated from information of the display object linked from the enlarged display object is also displayed. In this way, the zoom operation is repeated so that linked web pages can be browsed sequentially.

In addition, the display object is scaled down by conducting the zoom out operation. Since the display object of the link origin is also scaled down, the state before zoom in operation can be seen. Furthermore, by moving a mouse, location of the display object can be moved in every direction.

The keyword input area 22 is provided with a text box (a keyword input box) 22a for entering a keyword. The user can enter a keyword in the keyword input box 22a using the keyboard 15. Plural keywords can be entered with a space for separating them. When a return key is pressed, the entered keywords and a URL (a reference URL) of a web page corresponding to all display objects displayed in the display object area 21 are transmitted to the search server 12.

For example, in the case of the display screen shown in (a) of FIG. 2, the URLs corresponding to the display objects A, B and C are transmitted to the search server 12. This method is adopted as one of methods for designating the reference URL. Other methods for designating the reference URL includes a method of using all information of web pages that are not displayed on the screen but were already read into the browser 11e or a method of utilizing a URL registration function (a bookmark function) that a usual browser has.

As a method for transmitting data from the client computer 11 to the search server 12, POST by HTTP protocol is used. The search results transmitted from the search server 12 to the client computer 11 are displayed in a portion of the browser 11e under the keyword input box 22a. The search results will be explained later.

Figure 3:
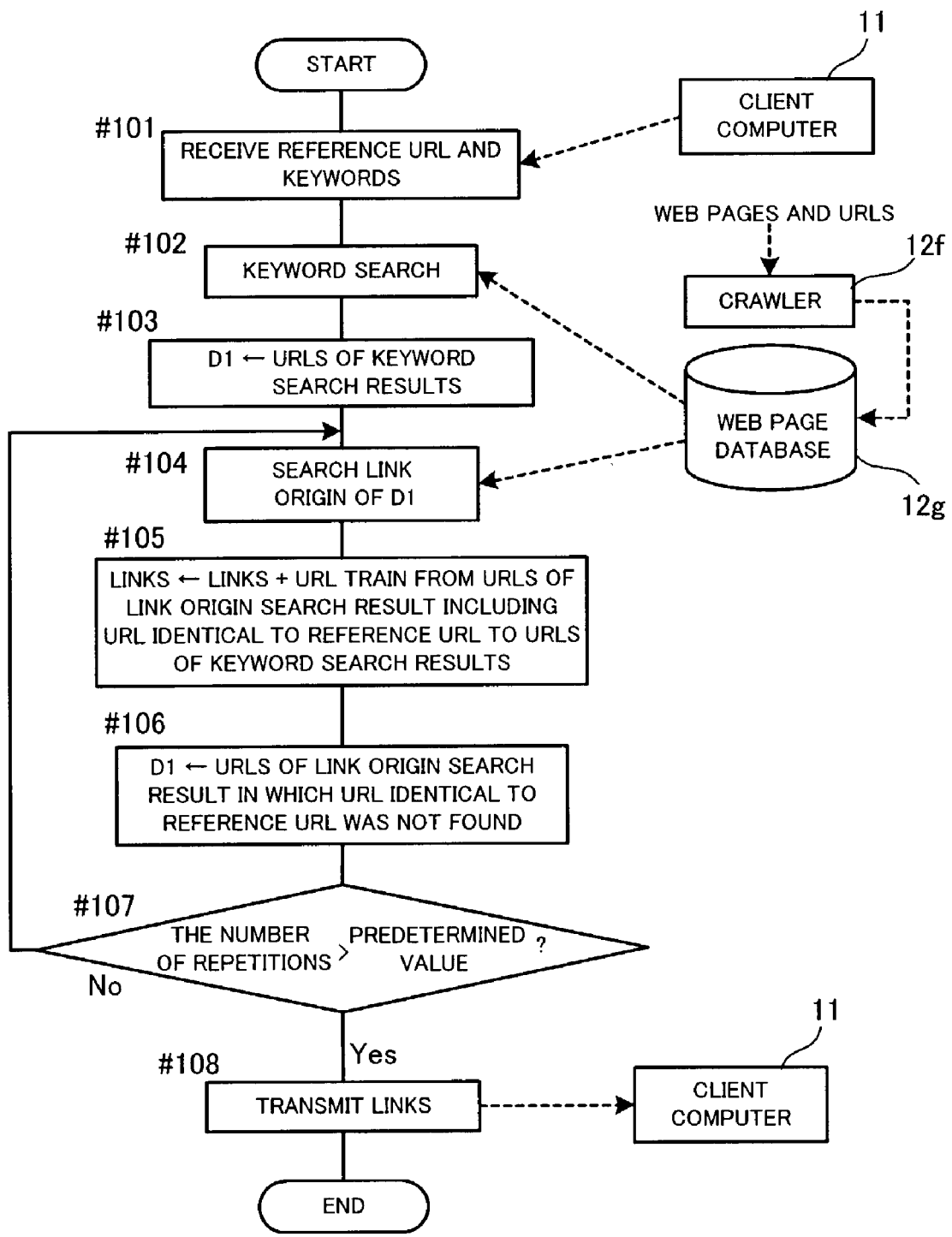
FIG. 3 is a flowchart showing a process of a search engine according to a first example.

FIG. 3 is a flowchart showing a process of the search engine according to a first example. In Step # 101, the search engine 12e receives the reference URL and the keywords from the client computer 11.

In the next Step # 102, the search engine 12e performs the keyword search of web pages. Namely, web pages containing all the keywords are searched from a web page database 12g. The web page database 12g stores information of web pages and URLs collected by the crawler 12f having access to the Internet 20 in the same way as a normal search engine for searching HTML documents.

In the next Step # 103, the search engine 12e stores URLs of the results of the keyword search as D1. In the next Step # 104, the search engine 12e searches a web page of a link origin that links to the web page corresponding to the URL stored as D1. This is realized by searching a web page containing a link to the URL stored as D1 from the web page database 12g.

In the Step # 105, the search engine 12e checks whether the URLs obtained as the result of the link origin search includes a URL that is identical to the reference URL. If an identical URL is included, it means that the link from the reference URL to the URL of the keyword search result is obtained. The chains of the obtained links (i.e., the URL train) are stored as Links.

In the next Step # 106, the search engine 12e stores the URL as D1 that is the result of the link origin search in which a URL that is identical to the reference URL was not found. If the number of repetitions does not exceed a predetermined value, e.g., ten (No in Step # 107), the process goes back to Step # 104 and repeats the above-mentioned steps. If this number of repetitions is not determined, the process will not finish if there is no connected link. Otherwise, the process will not finish in a predetermined time if the link path is very complicated. When the number of repetitions exceeds the predetermined value (Yes in Step # 107), the chain of links (the URL train) obtained as Links is sorted in order that is considered to be important for the user, and rinks after being sorted is transmitted to the client computer 11 (Step # 108).

Figure 4:
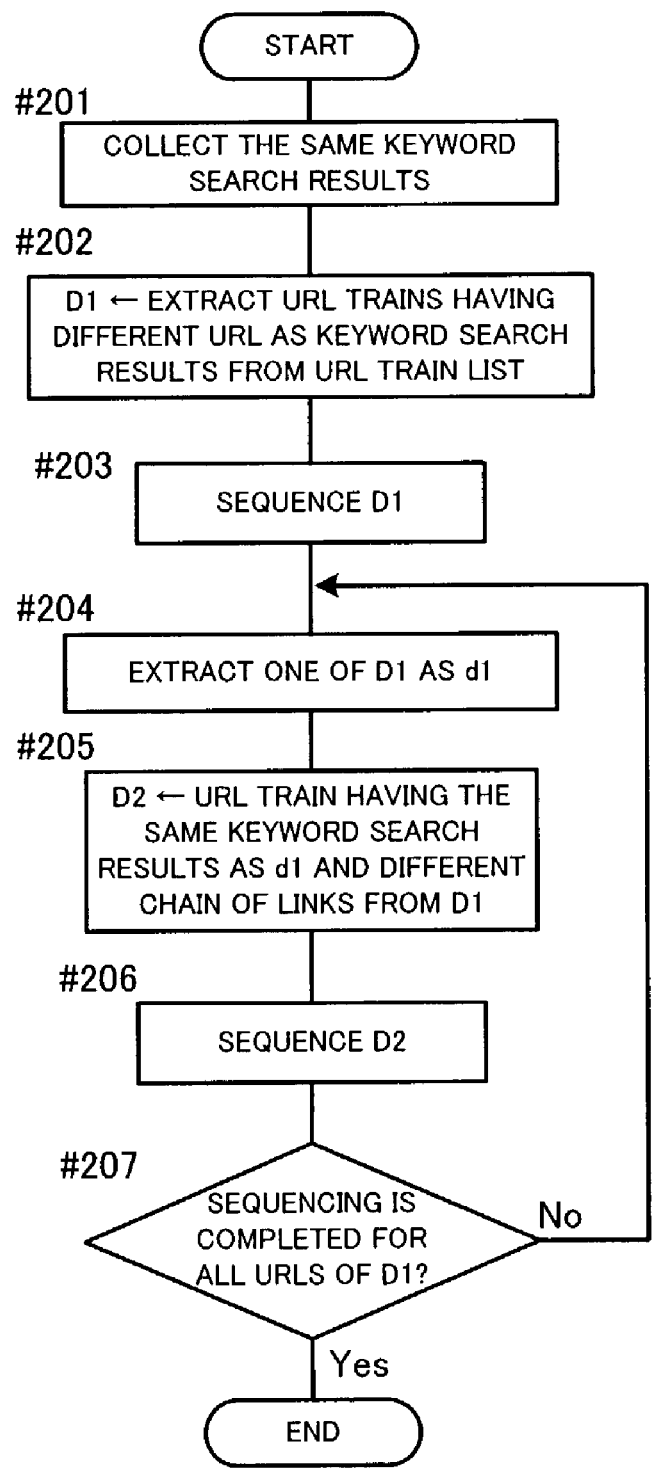
FIG. 4 shows a flowchart of a process for sorting the URL train obtained as the chain of links.

FIG. 4 shows a flowchart of a process for sorting the URL train obtained as the chain of links. In Step # 201, URL trains having the same web page obtained as the search results are collected. In the next Step # 202, URL trains having different URLs as the keyword search results are extracted from the URL train list and saved as D1. Since one web page can be linked from plural web pages, there can be plural paths to one web page.

In the next Step # 203, the web pages (D1) of the keyword search results are sequenced. This sequencing is performed in descending order of the number of hit keywords in a web page (D1), the number of hit keywords in all web pages corresponding to the URL train, i.e., the chain of links of the search result (hereinafter referred to as a chain of web pages) and the number of links from other web pages to the searched web page or the chain of web pages (the number of link sources). Alternatively, it is performed in ascending order of the length of the URL train as the search results.

In the following steps from Step # 204 through Step #206, the web pages having the same web page of the search result and different paths are sequenced. One of the web pages (D1) is extracted as d1 (Step # 204). The URL train having the same keyword search results as d1 and different chain of links from D1 is stored as D2 (Step # 205). After that, D2 is sequenced (Step # 206). This sequencing is performed in ascending order of the number of chains, or in descending order of the number of hit keywords in the web page corresponding to the chain of links or the number of link sources. If the sequencing is not completed for all URLs of D1 (No in Step # 207), the process goes back to Step # 204 and repeats the above-mentioned steps.

The above-mentioned method of sequencing is merely one example. It is possible to combine the number of hit keywords, the number of link sources and the number of chains. In addition, there is another method in which a web page having high score is stored in a database of the search engine, and a chain including the web page is ranked in the top position.

The process of the search engine shown in FIG. 3 is one example, and there are other various methods for obtaining a chain of links from the reference URL to the web page of the keyword search result. There is no problem in searching from a web page that does not use many links. However, when searching from a web page that uses many links, computational complexity can be too large. In this case, it is necessary to calculate the chain of links efficiently adding to determine an appropriate value of the above-mentioned number of repetitions.

For example, if many web pages of link origins are found, it is checked how many times the keyword that is used in the keyword search is found in each link origin web page. If the frequency of usage is smaller than a predetermined value, further search of link origins may be stopped. Alternatively, if the number of link sources that links to the link origin web page is smaller than a predetermined value, further search of link origins may be stopped. In another variation, if a web page of a link origin does not belong to the same domain as the web page, it can be excluded from the search. Thus, it is preferable not to search all the web pages of many link origins by weighting for chain of links. In addition, in order to prevent generation of a link loop, it is checked whether the searched link origin is included in the chain of links that is obtained previously or not. If it is included in the chain of links, the chain of links is excluded from further search, so that the computational complexity can be reduced.

Figure 5:
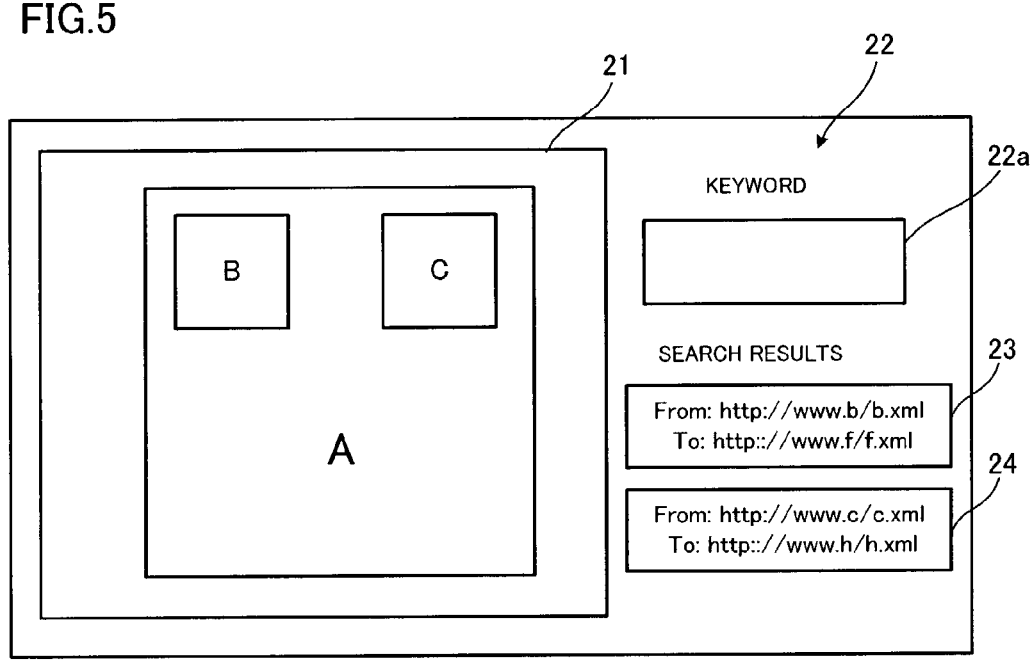
FIG. 5 shows an example of display of a search results screen.

FIG. 5 shows an example of display of a search results screen. The search results are displayed in the portion under the keyword input box 22a that is located at the right side of the display object area 21 of the browser 11e and include the reference URL and the search result URL. In the example shown in FIG. 5, it is supposed that two link chains, "http://www.b/b.xml-->http://www.d/d.xml-->http://www.f/f.xml" and "http://www.c/c.xml-->http://www.d/d.xml-->http://www.g/g.xml" are transmitted as the search result from the search server 12 to the client computer 11. The reference URL and the search result URL of the first link chain are displayed in the upper box 23, while the reference URL and the search result URL of the second link chain are displayed in the lower box 24. In each box, the URL following "from" in the first line is the reference URL, while the URL following "to" in the second line is the search result URL.

When the user selects one of the link chains 23 and 24 by click operation of the mouse, display of the browser 11e is changed as shown in FIG. 6. Further more, it is possible to transmit a part of a text contained in the web page of the search result URL together with information of the link chain from the search engine to the client computer 11 and to display them in the browser 11e so that the user can select easily.

FIG. 6 shows a change of the display screen when the first link chain is selected in the search results screen shown in FIG. 5. When the user selects the first link chain (the upper box) 23 by click operation of the mouse, the display screen of the browser 11e is changed to (a) of FIG. 6, and then is changed from (a) to (f) sequentially. Namely, in the order of the provided link chain, the operation of zooming in the display object after moving the web page corresponding to each URL to be located in the middle of the screen is repeated so as to reach a web page corresponding to a search result URL that is a destination. When displaying a URL of a web page whose information has not been obtained by the client computer, the information is obtained from the Internet corresponding to each display stage so that the display object is constructed.

This process enables a continuous display of web pages, so that the user can understand relationship among web pages easily. The above-mentioned display method is an example, and the point is to display so as to trace the chain of links. For example, instead of the automatic movement of viewpoint, it is possible to display (or decorate) an icon at the portion of the web page corresponding to the link to be displayed next. Alternatively, it is possible to display web pages except the web page to be displayed next in translucent manner. As another method, a color or a font of characters can be modified so that the user can distinguish the web page to be displayed next from other web pages and can be guided for a movement operation.

FIG. 7 shows an example of data as the search result that is transmitted from the search server 12 to the client computer 11. The search result data are described in XML (Extensible Markup Language). The data shown in FIG. 7 are merely an example, and the point is to transmit a URL train to the client computer 11. A tag <SearchLinks> indicates the URL train, and an attribution "href" thereof indicates URLs that are linked sequentially. A plurality of URLs is described with delimiters of spaces. The first URL is a reference URL, and the last URL is the search result URL. Between them there are URLs that are located on the path from the reference URL to the search result URL. As shown in FIG. 7, the URL trains that are search results include a URL train having different reference URLs and the same search result URL, and a URL train having the same reference URL, the same search result URL and different URLs on the path.

Figure 8:
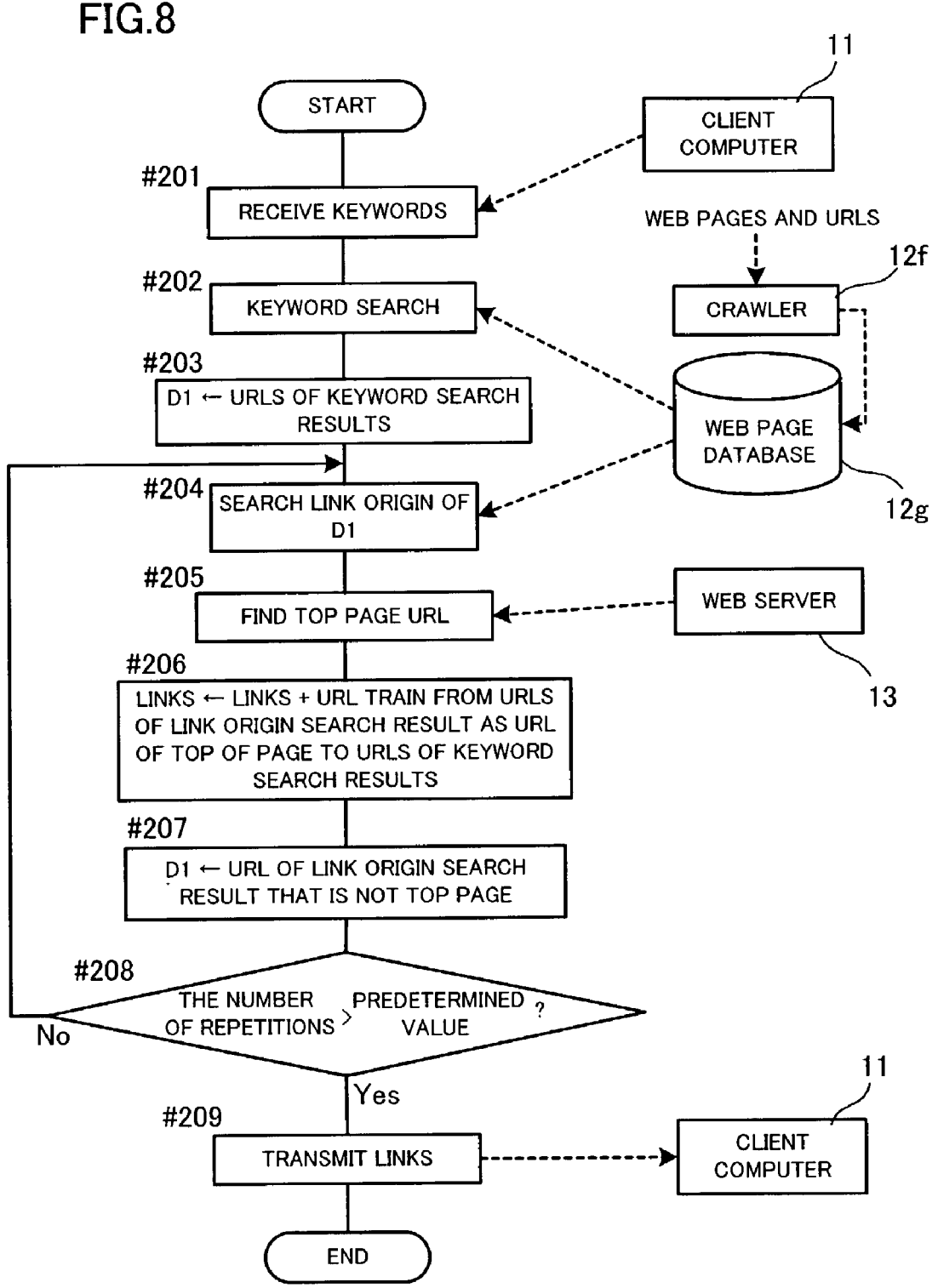
FIG. 8 is a flowchart showing a process of the search engine according to a second example.

FIG. 8 is a flowchart showing a process of the search engine according to a second example. As distinct from the search engine shown in FIG. 3, the example of the process of this search engine enables the user to search a web page that is not linked from the web page that is currently displayed. First in Step # 201, the search engine 12e receives the keywords from the client computer 11. In the next Step # 202, the search engine 12e performs the keyword search of web pages. Namely, web pages containing all the keywords are searched from the web page database 12g.

In the next Step # 203, the search engine 12e stores the URLs of keyword search results as D1. In the next Step # 204, the search engine 12e searches web pages of link origins having links to the web page corresponding to the URL stored as D1. This search is realized by searching a web page containing a link of the URL stored as D1 from the web page database 12g.

In the next Step # 205, the search engine 12e finds a top page URL. First, the search engine 12e checks whether or not the web page corresponding to the URL that was obtained as the keyword search result includes a tag <TopPage> indicating to be a top page. If the web page includes the tag, the designated URL is regarded as the top page URL. If the web page does not include the tag, the search engine 12e issues an HTTP request to the web server 13 having the obtained URL so as to obtain the top page URL from the web server 13. This process is realized by equipping the web server 13 with a function for transmitting a top page URL when a specific HTTP request is issued.

It is possible to use not the HTTP protocol but another protocol so that the search engine 12e can communicate with the web server 13. If the web server 13 does not transmit any response (e.g., in the case where the function for response is not installed), the search engine 12e checks the URLs stored in the hard disk drive 12c. The hard disk drive 12c stores a top page URL and conditions whether a URL corresponds to the top page URL or not.

For example, if web pages have the same portion of "www.a" in a URL "http://www.a/test.xml", they belong to the same domain, and their top page has a URL like "http://www.a/index.xml". If such a URL is not found, the search engine 12e estimates the top page URL from URLs obtained as the search results. In the case of HTML documents, for example, most top pages are the "index.html" just under the domain name such as "http://www.fujitsu.com/index.html" or the "index.html" under a directory starting from tilde such as "http://www.fujitsu.com/~foo/index.html". Therefore, it is checked whether or not a URL corresponds to a top page by comparing character string of the URL.

If the same URL is found in the comparison of the top page URL obtained in the above-mentioned way with the URL obtained by the link origin search, the link from the top page URL to the keyword search result URL is found. This found chain of links (i.e., the URL train) is stored as Links (Step # 206).

In the next Step # 207, the search engine 12e assigns D1 to the URL of the link origin search result that was not decided to be a top page and repeats the above-mentioned process from Step # 204 until the number of repetitions exceeds a predetermined value, e.g., ten (No in Step # 208). When the number of repetitions exceeds the predetermined value (Yes in Step # 208), the chain of links (the URL train) obtained as Links is transmitted to the client computer 11 (Step # 209).

In the case where this search engine is used, there is no link from the web page corresponding to the display object that is displayed in the browser 11e. Therefore, the display screen is switched so that web pages are displayed in order of the chain of links. Namely, the display shown in FIG. 5 is switched to the display shown in (a) of FIG. 6. After that, the display screen alters until (f) of FIG. 6 sequentially in the same way as explained above. Another display method will be explained later. In the case where this search engine is used, web pages are displayed from the top page sequentially, so that the user can understand the context easily.

FIG. 9 shows an example of web page data. This example of web data is described in XML. The description of a tag <Link> indicates a link, and an attribution "href" thereof indicates a URL of a link destination. In the link origin search shown in the flowchart of FIGS. 3 or 8, a web page is searched in which the tag <Link> is described that has the designated URL as the attribution "href". The tag <TopPage> indicates a method for designating a top page in a web page. As explained above, if a web page includes a tag <TopPage> in the process of obtaining a top page in the flowchart shown in FIG. 8, a URL designated by the attribution "href" thereof is the top page URL.

Furthermore, a tag <IsLinked> indicates a link origin. This tag is set and used as the result of the link origin search, so that load of process of the link origin search can be reduced. This method can be applied to both the first example (FIG. 3) and the second example (FIG. 8). The example of web data shown in FIG. 9 is merely an example. If it is not necessary to use the tag <TopPage> and the tag <IsLinked>, the web data can be described in HTML.

Figure 10:
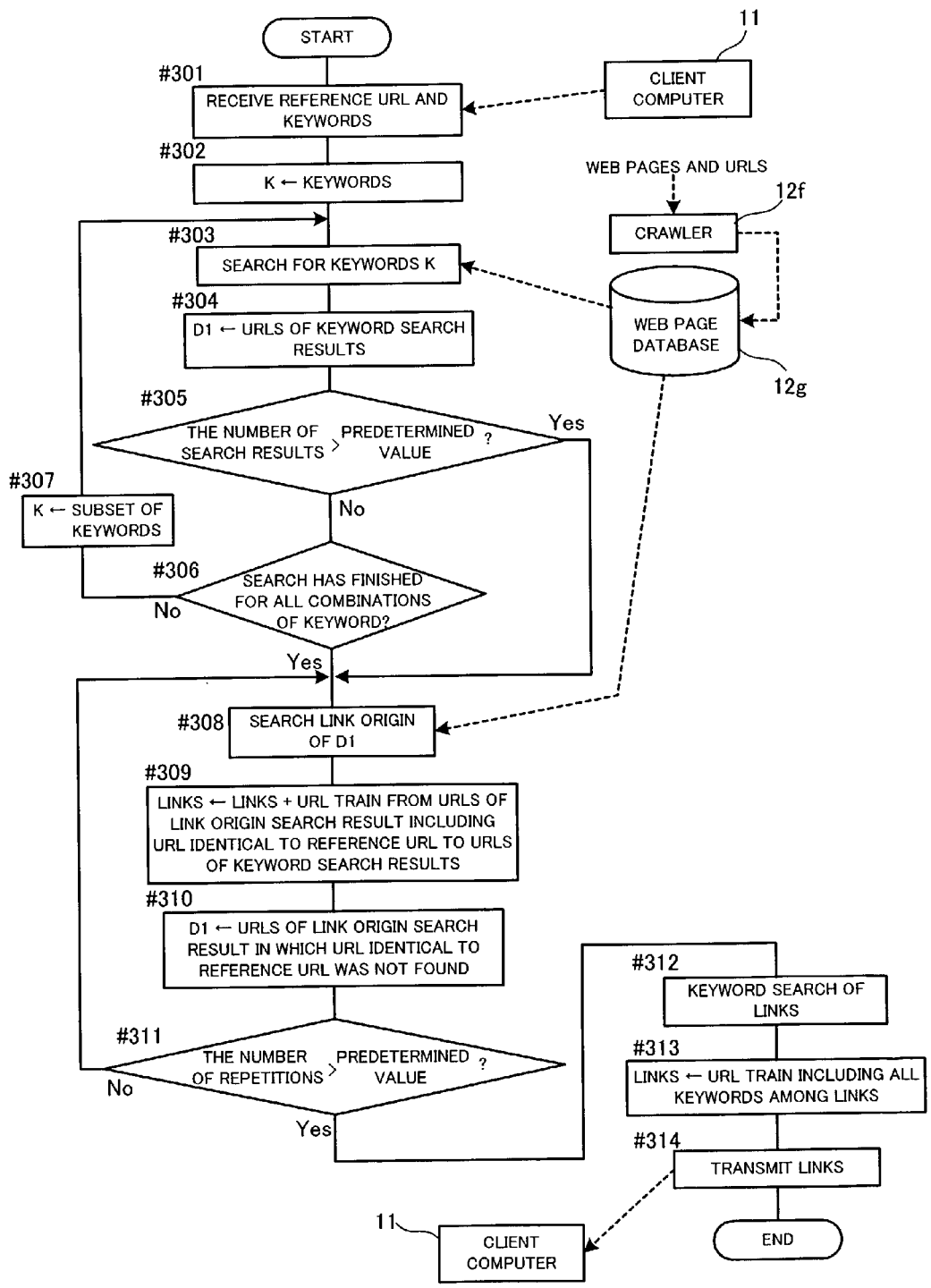
FIG. 10 is a flowchart showing a process of the search engine according to a third example.

FIG. 10 is a flowchart showing a process of the search engine according to a third example. This search engine is useful in the case where little text data are contained in one web page. Even if the keywords are distributed in plural web pages corresponding to the chain of links, the search results are transmitted.

First, the search engine 12e receives a reference URL and keywords from the client computer 11 (Step # 301) and stores the keywords as K (Step # 302). Then, the search engine 12e searches web pages containing all the keywords K from the web page database 12g in the same way as the search engine shown in FIG. 3 (Step # 303) and stores URLs of the keyword search results as D1 (Step # 304).

If the number of web pages obtained as the search results exceeds a predetermined value (Yes in Step # 305), or if the search finishes for all combinations of the keywords (Yes in Step # 306), the process goes to Step # 308. In other cases, a subset of keywords is stored as K (Step # 307) and the process from Step # 303 is repeated. Thus, search results above predetermined number can be obtained.

In the process from Step # 308 through Step #311, the search engine 12e obtains the chain of links in the same way as the search engine shown in FIG. 3. Namely, the search engine 12e searches web pages of link origins that have links to the web page of the URL stored as D1 (Step # 308) and checks whether or not any of the URLs that are obtained as the result of the link origin search are equal to the reference URL. If there is a URL equal to the reference URL, the obtained chain of links (i.e., the URL train) is stored as Links (Step # 309). Then, the search engine 12e assigns D1 to the URL of the link origin search result having no URL that is equal to the reference URL and repeats the above-mentioned process from Step # 308 until the number of repetitions exceeds a predetermined value, e.g., ten (Step # 311).

In the next Step # 312, keyword search of Links is performed, and then, it is checked whether or not the web page corresponding to the chain of links contains all the keywords in the next Step #313. After that, the URL train that contains all the keywords is stored as Links and is transmitted to the client computer 11 in Step # 314. According to this method, even if a web page does not contain all the keywords, it is found that the web page together with linked web pages contain all the keywords. It is possible to search a web page desired by a user from web pages having little text data such as a web page based on images.

Figure 11:
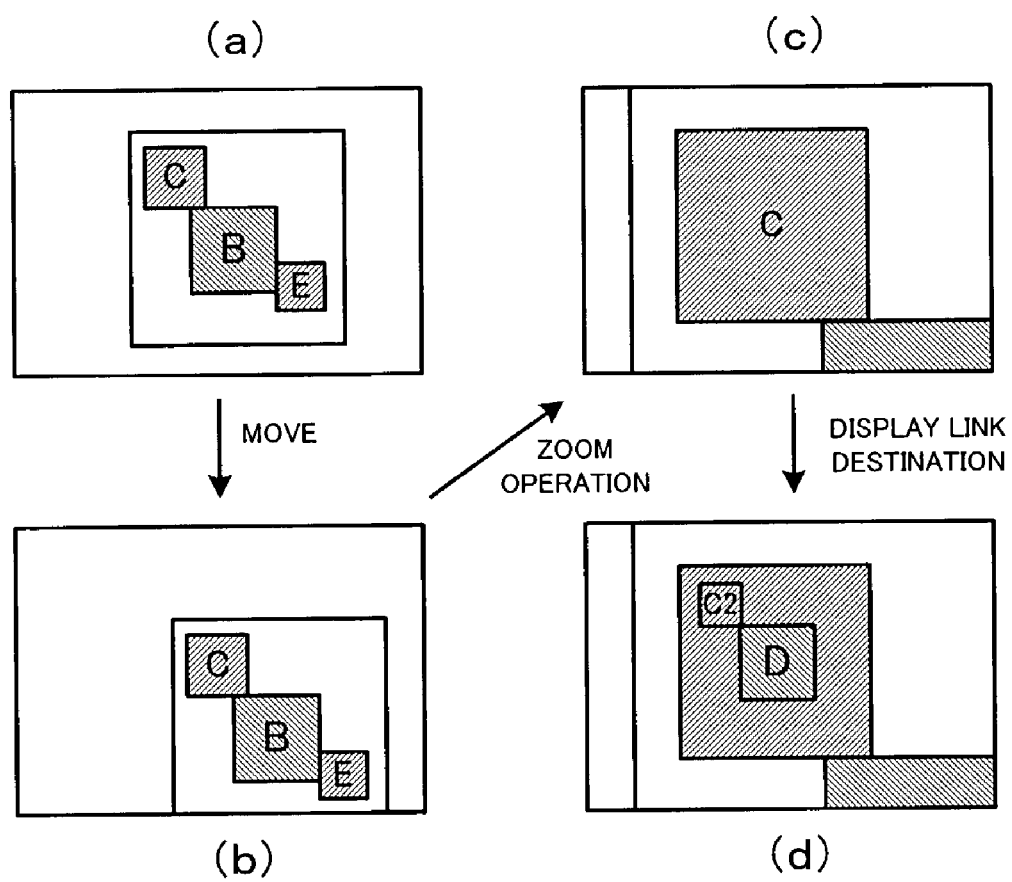
FIG. 11 is a diagram showing another example of display of the search results screen.
Figure 12:
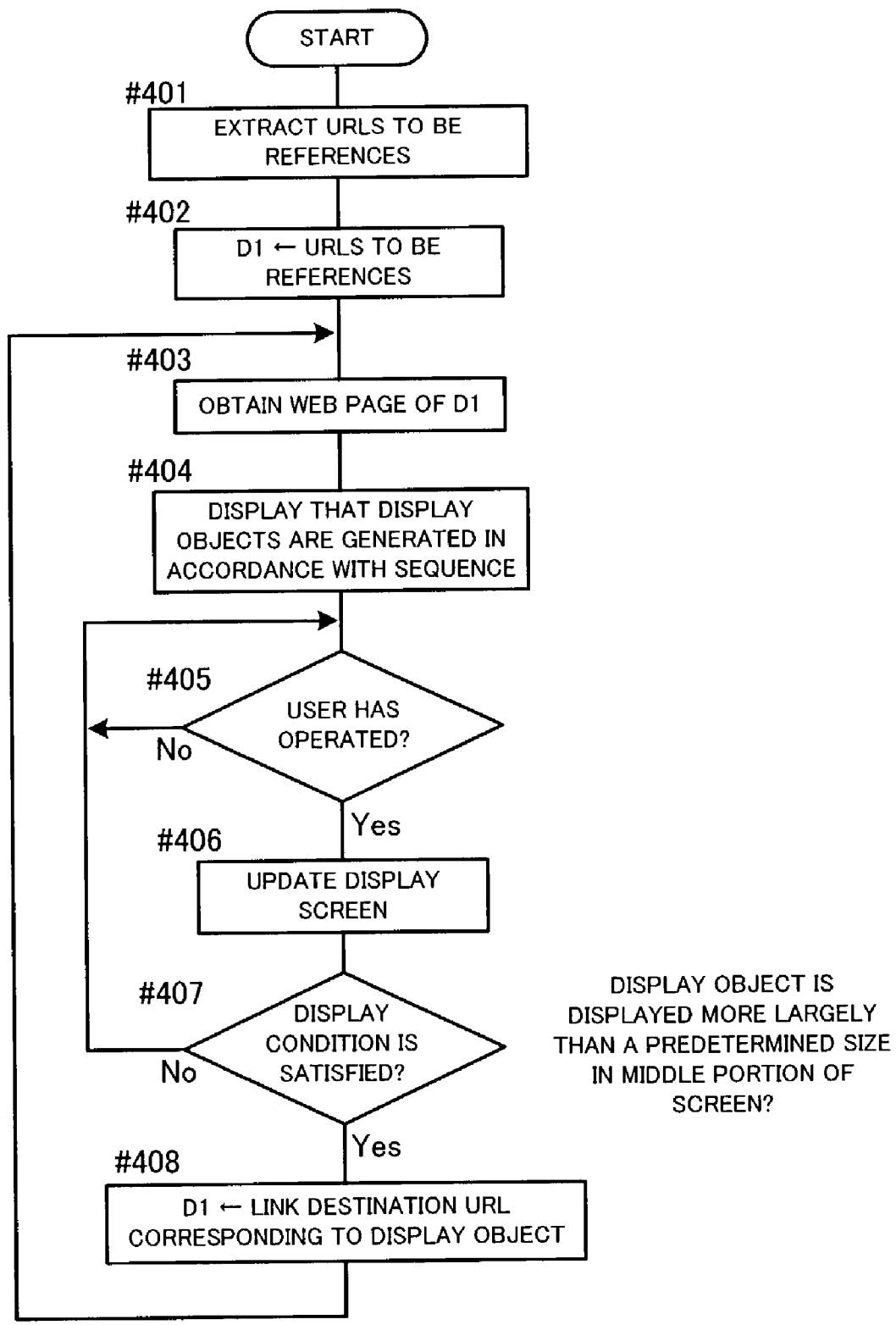
FIG. 12 is a flowchart of a process for displaying the search results screen shown in FIG. 11.

FIG. 11 is a diagram showing another example of display of the search results screen. FIG. 12 is a flowchart of a process for displaying the search results screen shown in FIG. 11. FIG. 11 shows an example of display based on the example of search results data shown in FIG. 7.

First, URLs to be references obtained as the search result are extracted and are stored as D1 (Step # 401 and Step #402). The corresponding web page is obtained from the web server 13 (Step # 403). In the next Step # 404, display objects are generated in accordance with the sequence. The object that is sequenced in higher order is displayed in the browser with lower transparency and in the middle portion of the screen (see (a) of FIG. 11).

In the case of this example, the URLs to be the reference obtained as the search results are "http://www.b/b.xml", "http://www.c/c.xml" and "http://www.e/e.xml". There are two search results having the reference of "http://www.c/c.xml". It is considered that a tag "SearchLinks" that is described in upper position has been assigned as higher order by the search engine. The web page corresponding to this URL is obtained from the web server 13. Then, the display object corresponding to the obtained web page is displayed on the screen of the browser.

In the case of this example, the URL having the highest order is "http://www.b/b.xml", and the display object B corresponding to this URL is displayed in the middle portion of the screen in opaque way. Then, the display objects C and E corresponding to other web pages are displayed around the display object B in translucent way (see (a) of FIG. 11). The extent of the translucence is preferably changed in accordance with the sequence order. Thus, the result that the search engine decided to be important is displayed for the user to recognize easily.

In the next Step # 405, it is checked whether or not the user conducted an operation. If the user conducted an operation, the display screen is updated (Step # 406 and see (b) of FIG. 11). The user can see the link destination by zoom operation using a mouse or a keyboard.

In the next Step # 407, it is checked whether or not the display condition is satisfied, i.e., the display object is displayed more largely than a predetermined size in the middle portion of the screen by the zoom in operation. If this condition is satisfied, the link destination URL to which the display object links is stored as D1 (Step # 408), and the process from Step # 403 is repeated. Namely, the web page corresponding to the newly stored link destination URL is obtained and is displayed.

An object having higher order is displayed with lower transparency in the middle portion of the screen. In the case of this example, it is supposed that the object C (http://www.c/c.xml) is moved to be located in the middle portion of the screen and is enlarged to a size larger than a predetermined size by the zoom in operation (see (c) of FIG. 11). On this occasion, a web page to which the object C links is read in, and the display objects C2 and D corresponding to the web page are displayed (see (d) of FIG. 11). Since the object C links to two URLs, i.e., "http://www.d/d.xml" and "http://www.c/c2.xml", "http://www.d/d.xml" of higher order is displayed in opaque way in the middle of the screen, while "http://www.c/c2.xml" of lower order is displayed in translucent way at the side thereof. The above-mentioned process is repeated until the web page of the search result is displayed.

According to the search server and the search results providing method of the present invention, web pages can be displayed tracing a link in a client computer that uses a browser capable of displaying web pages continuously. A user can browse not a single web page but a set of continuous web pages so as to understand relationship among web pages easily.

Furthermore, if all the requested contents are contained not in one web page but in plural linked web pages, they are found effectively. For example, a web page containing much image information and little text information can be found easily.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A search server, comprising:
   a web page information storing portion for collecting web page information and URLs from a network so as to store them;
   a keyword obtaining portion for obtaining a keyword from a client computer;
   a keyword searching portion for searching web page information containing the obtained keyword;
   a reference URL obtaining portion for obtaining a URL of a web page to be a reference; and
   a link searching portion for searching a chain of links, which reaches the web page obtained by the keyword searching portion at last by tracing links included in a web page sequentially, wherein the search server transmits a list of URL trains corresponding to the chain of links to the client computer;
   wherein a chain of links containing a web page of a specific URL stored in advance is assigned to higher order.

2. The search server according to claim 1, wherein the reference URL obtaining portion obtains the URL of the web page to be a reference from the client computer.

3. The search server according to claim 1, wherein the reference URL obtaining portion obtains a URL of an index page from a web server providing the web page obtained by the keyword searching portion and sets the URL as the URL of the web page to be a reference.

4. The search server according to claim 1, further comprising a reference URL storing portion for storing the URL of the web page to be a reference, wherein the reference URL obtaining portion obtains from the reference URL storing portion the URL of the web page that will serve as a reference.

5. The search server according to claim 1, wherein the reference URL obtaining portion seeks a URL of a top page from the URL of the web page obtained by the keyword searching portion so that the URL is set to be the URL of the web page to be a reference.

6. The search server according to claim 1, wherein the reference URL obtaining portion obtains the URL of the web page to be a reference from information described in the web page obtained by the keyword searching portion.

7. The search server according to claim 1, wherein the link searching portion searches the chain of links utilizing link origin information described in a web page.

8. The search server according to claim 1, wherein if the keyword obtaining portion obtains plural keywords from the client computer, the keyword searching portion searches a web page that contains some of the plural keywords and checks whether additional keywords are contained in one or more web pages constituting the chain of links detected by the link searching portion, and if the other keywords are contained in the web pages, the URL train corresponding to the chain of links thereof is included in the list of URL trains that is transmitted to the client computer.

9. A method for providing search results, comprising transmitting a list of URL trains as the search results from a search server to a client computer, the search server including a web page information storing portion for collecting web page information and URLs from a network so as to store them, a keyword obtaining portion for obtaining a keyword from the client computer, a keyword searching portion for searching web page information containing the obtained keyword, a reference URL obtaining portion for obtaining a URL of a web page to be a reference, and a link searching portion for searching a chain of links, which reaches the web page obtained by the keyword searching portion at last by tracing links included in a web page sequentially, wherein the list of URL trains is transmitted so that a browser of the client computer can display web pages corresponding to the URL train sequentially;
   wherein the list of URL trains is transmitted so that a browser of the client computer can highlight a specific display object of web pages constituting the chain of links distinguishably from other display objects; and
   wherein if the link searching portion obtains plural chains of links for one web page obtained by the keyword searching portion, the plural chains of links are sequenced in accordance with information of one or more web pages constituting the chain of links before being transmitted to the client computer, and the list of URL trains is transmitted so that the browser of the client computer can highlight a display object of a web page included in a URL train of a chain of links that is assigned to higher order.

* * * * *